(No Model.) 5 Sheets—Sheet 1.

J. E. GREENHILL.
APPARATUS FOR CONTROLLING THE SPEED OF CLOCKWORK MECHANISM.

No. 494,633. Patented Apr. 4, 1893.

Witnesses:
Inventor:

(No Model.) 5 Sheets—Sheet 2.
J. E. GREENHILL.
APPARATUS FOR CONTROLLING THE SPEED OF CLOCKWORK MECHANISM.
No. 494,633. Patented Apr. 4, 1893.

Witnesses:

Inventor:

(No Model.)

5 Sheets—Sheet 3.

J. E. GREENHILL.
APPARATUS FOR CONTROLLING THE SPEED OF CLOCKWORK MECHANISM.

No. 494,633.

Patented Apr. 4, 1893.

Witnesses:

Inventor:

(No Model.) 5 Sheets—Sheet 4.

J. E. GREENHILL.
APPARATUS FOR CONTROLLING THE SPEED OF CLOCKWORK MECHANISM.

No. 494,633. Patented Apr. 4, 1893.

Witnesses:

Inventor:

(No Model.)
5 Sheets—Sheet 5.
J. E. GREENHILL.
APPARATUS FOR CONTROLLING THE SPEED OF CLOCKWORK MECHANISM.
No. 494,633.  Patented Apr. 4, 1893.
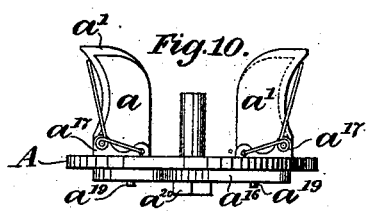
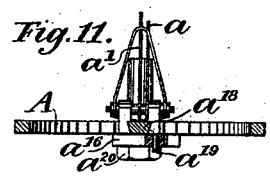
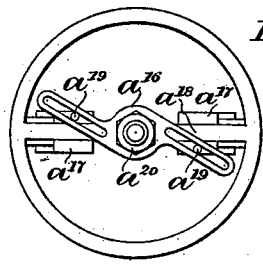
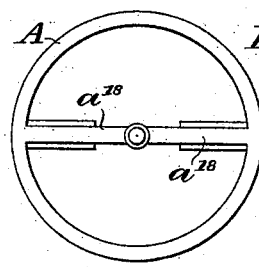
Witnesses:
Inventor:

UNITED STATES PATENT OFFICE.

JOSEPH EXALL GREENHILL, OF LONDON, ASSIGNOR OF ONE-HALF TO GEORGE EDWARD GOURAND, OF BEULAH HILL, ENGLAND.

APPARATUS FOR CONTROLLING THE SPEED OF CLOCKWORK MECHANISM.

SPECIFICATION forming part of Letters Patent No. 494,633, dated April 4, 1893.

Application filed March 25, 1892. Serial No. 426,443. (No model.) Patented in England May 8, 1891, No. 7,962.

*To all whom it may concern:*

Be it known that I, JOSEPH EXALL GREENHILL, a subject of the Queen of Great Britain and Ireland, residing at 116 Downs Park Road, Clapton, London, in the county of Middlesex, England, have invented a new and useful Apparatus for Controlling the Speed of Clockwork Mechanism and other Machinery, (in respect whereof I have obtained Letters Patent of Great Britain, No. 7,962, bearing date May 8, 1891,) of which the following is a specification.

My invention has mainly for its object to control the speed of clock-work mechanism in such a manner that the speed shall be maintained practically uniform, notwithstanding considerable variations in the amount of work to be accomplished and, when a spring is used, in the power exerted thereby.

In the accompanying drawings is illustrated the mode in which I prefer to carry out my invention.

Figure 1:
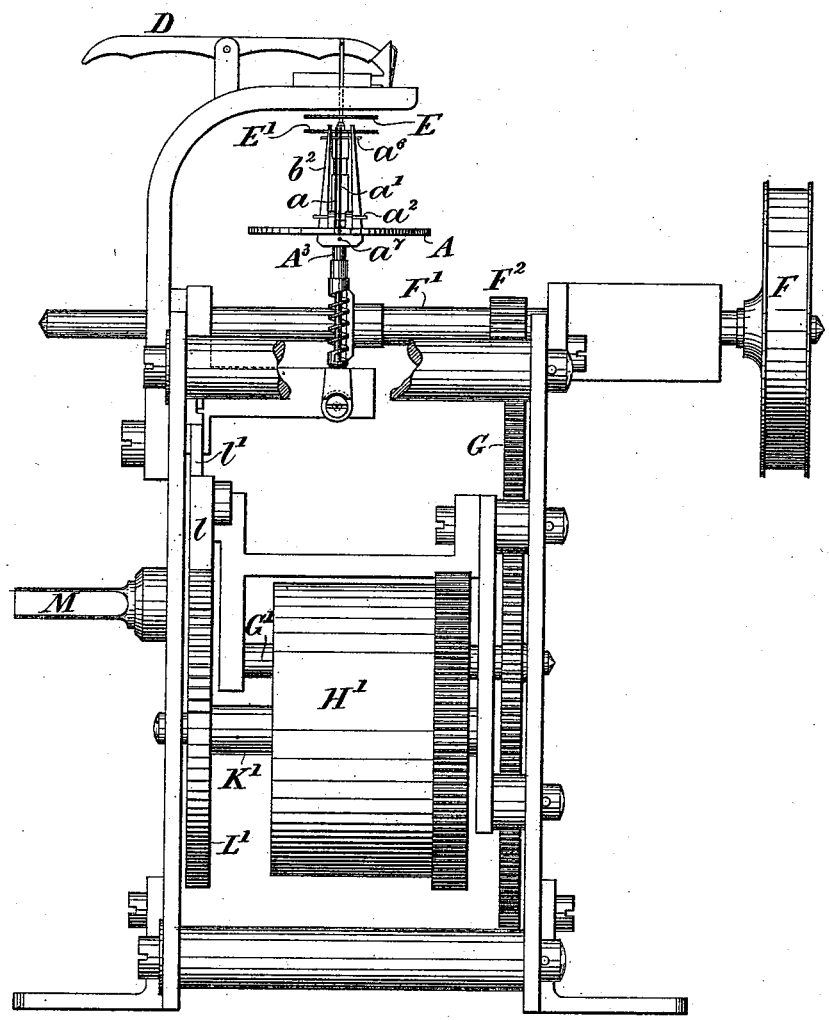
Figure 2:
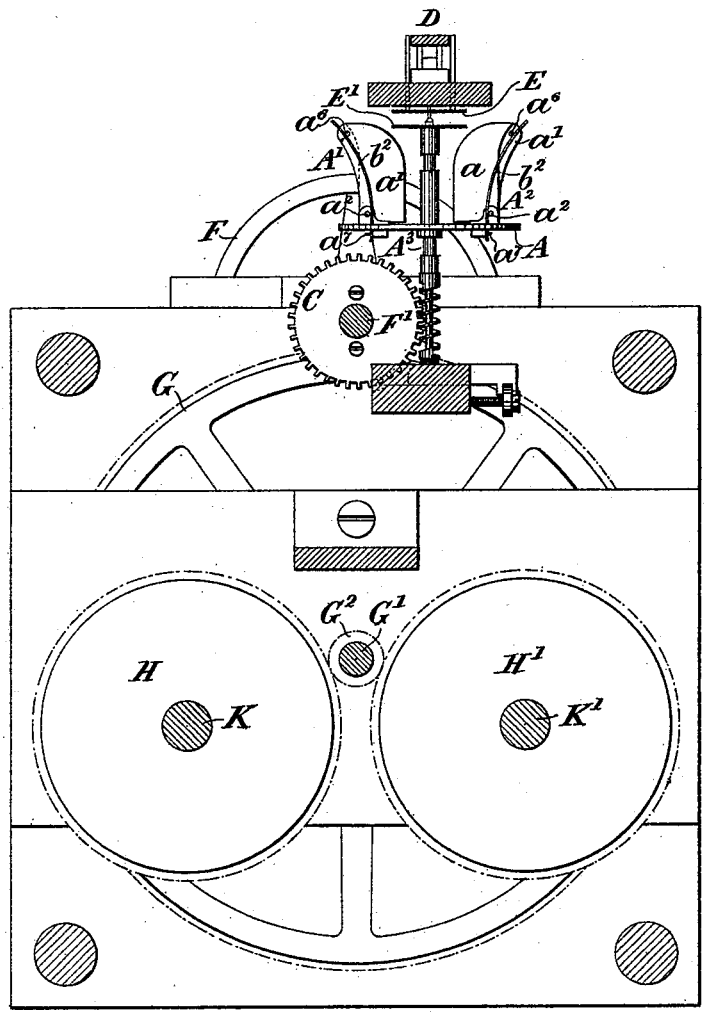
Figure 3:
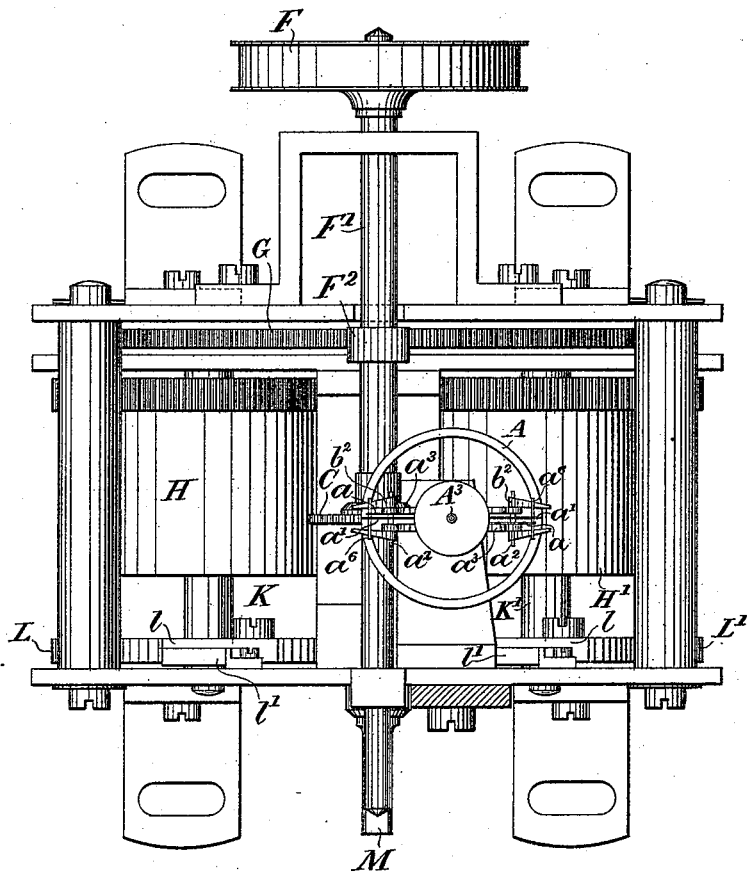
Figure 4:
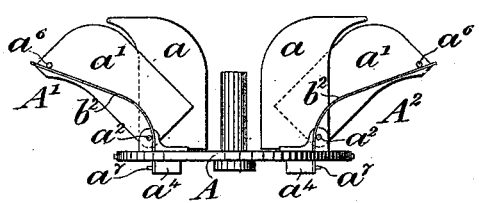
Figure 6:
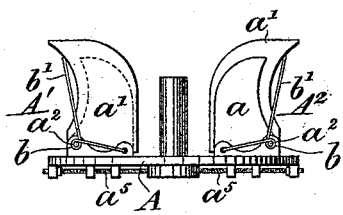
Figure 5:
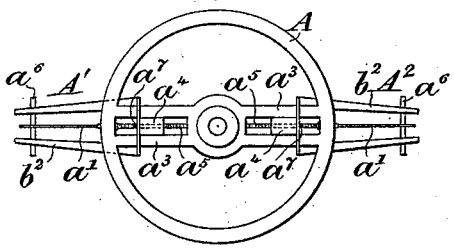
Figure 7:
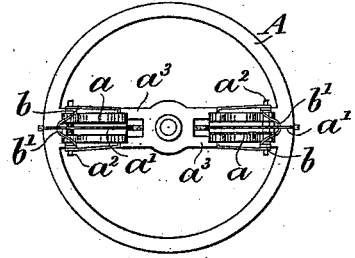
Figure 8:
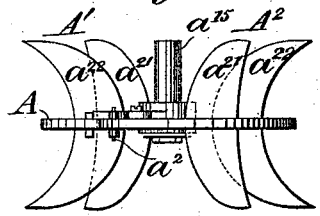
Figure 9:
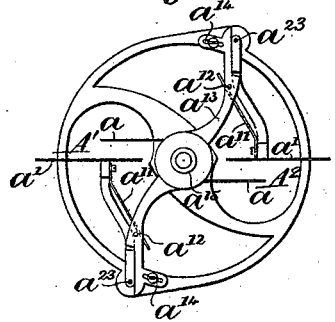

Figure 1 is a side elevation, Fig. 2 a vertical section, and Fig. 3 a plan (the bearing bracket being partly broken away). Fig. 4 is a separate view of the vane-wheel with the pivoted vanes extended; Fig. 5 being a corresponding plan. Figs. 6 to 13 represent various modifications of the vane-wheel.

I apply, at any suitable part of the train of wheels, a vane-wheel, the vanes or wings of which are so arranged that, when there is any tendency for the speed to increase beyond or to sink below the normal, the effective area of such vanes or wings is automatically increased or decreased so as to offer a greater or less resistance to rotation and thus to maintain the normal speed. Various arrangements may be employed for accomplishing this end. Thus, according to the arrangement illustrated in Figs. 1 to 5, I provide a horizontal disk or wheel A with two opposite wings $A'$ and $A^2$, each of which is composed of a fixed part or vane $a$ and a movable part or vane $a'$ placed side by side. The movable part $a'$ is pivoted at $a^2$, and is acted upon by a spring in such a manner that the spring tends to keep it in an inward position, as in Figs. 1 to 3, relatively to the axis $A^3$, while the centrifugal action tends to cause it to turn outward on its pivot $a^2$ against the action of the spring, as in Figs. 4 and 5. By thus turning outward, the movable part $a'$ offers a gradually-increasing area beyond the edge of the fixed part $a$, which produces a correspondingly-increased resistance to the rotation, whereby the speed is prevented from exceeding the normal to any appreciable extent.

The spring $b\ b'$ (Figs. 6 and 7) may be constructed as follows:—A wire is bent into a helical coil $b$; the wire being formed, at the middle of the length of the coil, into a projecting loop or arm $b'$. The coil is placed upon the axis $a^2$ on which the movable part of the wing turns; the loop $b'$ being made to bear against the outer edge of that part, while the two ends of the coil are secured in any suitable manner. On the part $a'$ turning outward, owing to increased speed and centrifugal action, the coil is tightened and its resistance increased. The loop or arm $b'$ is at the same time bent, with the result that its bearing on the vane is brought appreciably nearer to the axis $a^2$. Under such circumstances, as the power of the spring increases, the loop or arm acts on the part $a'$ with decreased leverage, so that the one variation practically counteracts the other. The action of the spring may, therefore, in this way be compensated or made constant for any position of the movable part of the wing. If preferred, the coil, instead of being placed on the axis $a^2$, may be mounted on a pin situated between that axis and the center $A^3$. Under such circumstances, when the effort of the spring is at its maximum, the leverage is shortened according to the distance the pivot of the coil has been shifted toward the center $A^3$. A forked flat spring $b^2$ made from sheet steel, shown in Figs. 1 to 5, may, however, be substituted for the spring $b\ b'$. The base of the spring bears against a pin $a^6$ put transversely through the upper end of the vane $a'$. The base of the spring snaps over the pin $a^7$, which keeps the spring in position.

The wings $A'$ and $A^2$ may be rendered adjustable to and from the axis $A^3$ so as to enable the apparatus to be regulated to suit any desired normal speed. This may be effected in various ways. According to the arrangement which I prefer to employ, the wings $A'$ and $A^2$ are capable of sliding in slotted or grooved radial arms $a^3$; each fixed part $a$ having a lateral eye $a^4$ through which screws a screw-spindle $a^5$ carried by the corresponding arm $a^3$, so that, by turning such screw-spindle in one direction or the other, both parts $a$ and $a'$ pertaining to the wing $A'$ or $A^2$ are moved together in the slot or groove to or from the axis of the wheel A. Both wings may, however, be operated by one screw-spindle having two threads, one right and the other left. By this arrangement, uniform adjustment of the two wings would be secured, and adjustment could be effected in one half the time, as there would be only one screw-spindle to turn. The right-and-left screw-spindle would pass on one side of the axis $A^3$, and the eyes $a^4$ would project laterally to engage with it. Each vane may, however, be mounted on a vertical axis $a^{23}$, Figs. 8 and 9, instead of on a horizontal axis. In this construction, each vane $a^{21}$ or $a^{22}$ may be made crescent-shaped, and a flat spring $a^{11}$ screwed to each vane $a^{22}$ may be used; the free end of the spring $a^{11}$ bearing against a pin $a^{12}$ on an arm $a^{13}$. The arm $a^{13}$ carries two pins $a^{12}$, one for each spring $a^{11}$. In order to vary the tension of the springs, and thereby regulate the sensitiveness of the device, it is merely necessary to adjust the relative position of the arm $a^{13}$ with respect to the wheel or disk A. This may be done by releasing the screws $a^{14}$ and retightening them after adjustment has been effected. In the drawings, the arm $a^{13}$ is fixed to the axis $A^3$ by means of the collar $a^{15}$; the wheel A turning on the collar. It is, however, obvious that the wheel A might be fixed to the axis $A^3$, and the arm $a^{13}$ turn on the boss of the wheel.

Instead of using the screw-spindles $a^5$ shown in Figs. 4 to 7 for adjusting the wings $A'$ and $A^2$, a pair of slotted arms $a^{16}$ (Figs. 10 to 12) pivoted on the boss of the wheel may be employed. Each pair of vanes $a\ a'$ are mounted on a block $a^{17}$ formed to slide on an arm $a^{18}$, part of which is of dovetail form in cross section (Fig. 11), the other part being rectangular (Fig. 13) to allow of the block being put in position. From each block there projects a pin $a^{19}$, which engages with one of the slotted arms $a^{16}$. By varying the position of the slotted arms rotatively, the blocks and consequently the wings $A'$ and $A^2$ can be readily adjusted; both blocks being equally affected. The slotted arms are secured by a nut $a^{20}$.

As before stated, my above-described invention is more particularly applicable to clock-work mechanism requiring the greatest possible uniformity of motion, notwithstanding variations in the amount of work to be accomplished or in the power of the spring, but it is also applicable for maintaining uniform motion in machinery in all cases where such motion can be governed by a fly.

In instances where a greater resistance to variation of speed is required than can be obtained by the use of adjustable vanes revolving in air, the vane-wheel may be immersed in a liquid or in compressed gas contained in a closed vessel.

Instead of having only two sets of vanes or wings, any greater number, arranged symmetrically around the main axis $A^3$, may be employed.

The worm-wheel C engages with a worm on the axis $A^3$, thus causing the rotation of the controlling apparatus.

D is a lever for actuating a disk-brake E, which bears against a corresponding disk $E'$ on the upper end of the axis $A^3$.

F is a driving wheel secured on the shaft $F'$, which carries the pinion $F^2$; the latter being driven by the spur-wheel G keyed on the shaft $G'$.

H and $H'$ are spring-barrels which gear with a pinion $G^2$ on the shaft $G'$, thereby driving that shaft. These barrels are mounted on the shafts K and $K'$, each of which is provided with a ratchet-wheel L or $L'$ held by a ratchet $l$ pivoted to the framework and actuated by a spring $l'$. The ratchet-wheels L and $L'$ are utilized in winding up the main springs; a pinion mounted on the squared shaft M engaging with and driving both ratchet-wheels.

A clock-work motor fitted with my controlling apparatus is particularly suitable for driving a phonograph or graphophone.

What I claim as my invention, and desire to secure by Letters Patent, is—

1. An apparatus for controlling the motion of clock-work mechanism and other machinery, consisting of a rotating wheel or disk A, wings $A'$ and $A^2$ mounted thereon, each wing made up of a fixed part and a pivoted part, the pivoted part being adapted to move outward under the influence of centrifugal force in order to increase the effective area of the two parts of the wing, and springs which tend to keep the pivoted parts closed, substantially as herein described.

2. An apparatus for controlling the motion of clock-work mechanism and other machinery, consisting of a rotating wheel or disk A, wings $A'$ and $A^2$ mounted thereon, each wing made up of a fixed part $a$, a pivoted part $a'$ and a base or block by which the two parts $a$ and $a'$ are supported, such base or block being adapted to slide toward or from the axis of the wheel or disk A, so that the wings can be adjusted to enable the apparatus to be regulated to suit any desired normal speed, substantially as herein described.

3. An apparatus for controlling the action of clock-work mechanism and other machinery, consisting of a rotating wheel or disk A, wings $A'$ and $A^2$ mounted thereon, each wing made up of a fixed part and a pivoted part, the pivoted part being adapted to move outward under the influence of centrifugal force, springs which tend to keep the pivoted parts closed, and means for varying the normal amount of tension on the springs for the purpose of regulating the sensitiveness of the device, substantially as herein described.

JOSEPH EXALL GREENHILL.

Witnesses:
SAMUEL THOMAS DONNAN,
ALFRED HILLYARD SWINSTEAD.